US009682771B2

(12) United States Patent
Knag et al.

(10) Patent No.: US 9,682,771 B2
(45) Date of Patent: Jun. 20, 2017

(54) CONTROLLING ROTOR BLADES OF A SWASHPLATELESS ROTOR

(71) Applicant: Sikorsky Aircraft Corporation, Stratford, CT (US)

(72) Inventors: John Knag, Milford, CT (US); Anthony Litwinowicz, Derby, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 639 days.

(21) Appl. No.: 13/966,951

(22) Filed: Aug. 14, 2013

(65) Prior Publication Data

US 2015/0050142 A1 Feb. 19, 2015

(51) Int. Cl.
*B64C 27/04* (2006.01)
*B64C 27/54* (2006.01)
*B64C 27/72* (2006.01)

(52) U.S. Cl.
CPC .............. *B64C 27/04* (2013.01); *B64C 27/54* (2013.01); *B64C 2027/7216* (2013.01); *Y02T 50/34* (2013.01)

(58) Field of Classification Search
CPC .................. B64C 2027/7216; B64C 27/54
See application file for complete search history.

(56) References Cited

U.S. PATENT DOCUMENTS

| 4,379,678 A * | 4/1983 | Carlock .................. B64C 27/54 416/158 |
| 4,519,743 A | 5/1985 | Ham |
| 5,676,334 A * | 10/1997 | Cotton .................... B64C 27/54 244/12.2 |
| 6,666,649 B2 | 12/2003 | Arnold |
| 7,207,778 B2 * | 4/2007 | Bittner .................... B64C 27/32 416/136 |
| 8,197,205 B2 | 6/2012 | Rudley et al. |
| 8,235,324 B1 | 8/2012 | Birch et al. |
| 8,235,667 B2 | 8/2012 | Waide et al. |
| 2007/0131820 A1 | 6/2007 | Chaudhry et al. |
| 2012/0181379 A1 | 7/2012 | Eller et al. |

FOREIGN PATENT DOCUMENTS

| EP | 0272058 A2 | 6/1988 |
| GB | 2085194 A | 4/1982 |

OTHER PUBLICATIONS

European Search Report, dated Feb. 13, 2015, EP Application No. 14180748.7 (6 pages).

\* cited by examiner

*Primary Examiner* — Mary A Davis
(74) *Attorney, Agent, or Firm* — Cantor Colburn LLP

(57) ABSTRACT

Controlling rotor blades of a rotor assembly includes determining an azimuthal position of a rotor assembly and identifying a lateral control command value, a longitudinal control command value and a collective control command value of a rotor assembly control system. A sine value and a cosine value of the azimuthal position are calculated and separate blade commands signals are generated for each separate blade of the rotor assembly to control a position of each blade independent of each other blade. The blade command signals are generated based on combining the sine and cosine values of the azimuthal position with the lateral control command value, the longitudinal control command value and the collective control command value.

17 Claims, 4 Drawing Sheets

CONTROLLING ROTOR BLADES OF A SWASHPLATELESS ROTOR

BACKGROUND OF THE INVENTION

The subject matter disclosed herein relates to individually controlled rotor blades, and in particular to controlling each rotor blade of a swashplate-less rotor separately from each other blade.

Rotor blades typically rely on a swashplate to control the pitch of the rotor blades. In particular, a swashplate assembly typically includes a fixed plate and a rotating plate. The fixed plate is controlled based on flight control signals, and the movement of the fixed plate results in a corresponding movement of the rotating plate, which in turn controls the pitch of the rotating rotor blades.

BRIEF DESCRIPTION OF THE INVENTION

According to one aspect of the invention, a method for controlling rotor blades of a rotor assembly includes determining an azimuthal position of a rotor assembly, identifying a lateral command value, a longitudinal command value and a collective command value of a rotor assembly control system, and calculating a sine value and a cosine value of the azimuthal position. The method includes generating a separate blade control signal for each separate blade of the rotor assembly to control a position of each blade independent of each other blade based on combining the sine and cosine values of the azimuthal position with the lateral command value, the longitudinal command value and the collective command value.

According to another aspect of the invention, a rotor blade position control assembly including a rotor including a plurality of rotor blades and first and second rotor blade control servos connected to separate first and second blades among the plurality of rotor blades to control the position of the first and second blades. The rotor blade position control assembly further includes a rotor blade control computer configured to receive an azimuthal position value of a rotor assembly, to identify a lateral command value, a longitudinal command value and a collective command value, to calculate a sine value and a cosine value of the azimuthal position, and to generate a first rotor blade control signal to transmit to the first rotor blade control servo and a second rotor blade control signal to transmit to the second rotor blade control servo based on combining the sine and cosine values of the azimuthal position with the lateral command value, the longitudinal command value and the collective command value.

Another aspect of the invention includes a rotor blade control computer for controlling rotor blades of a rotor assembly. The rotor blade control computer includes memory configured to store a rotor blade control program and one or more of an azimuthal position value, a lateral command value, a longitudinal command value and a collective command value and a processor configured to execute the rotor blade control program to perform a method for controlling the rotor blades of the rotor assembly. The method includes obtaining the azimuthal position value of a rotor assembly, obtaining the lateral command value, the longitudinal command value and the collective command value, and calculating a sine value and a cosine value of the azimuthal position. The method further includes generating a first rotor blade control signal to transmit to a first rotor blade control servo for controlling a first rotor blade of the rotor assembly and a second rotor blade control signal to transmit to a second rotor blade control servo to control a second rotor blade of the rotor assembly, the first rotor blade control signal and the second rotor blade control signal generated based on combining the sine and cosine values of the azimuthal position with the lateral command value, the longitudinal command value and the collective command value.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Conventional rotor systems use swashplates to control the pitch of the rotor blades of the rotor system. However, in a rotor system in which the pitch of each rotor blade is controlled separately without a swashplate, a system and method are needed to generate the control signals capable of controlling each rotor blade separately.

Figure 1:
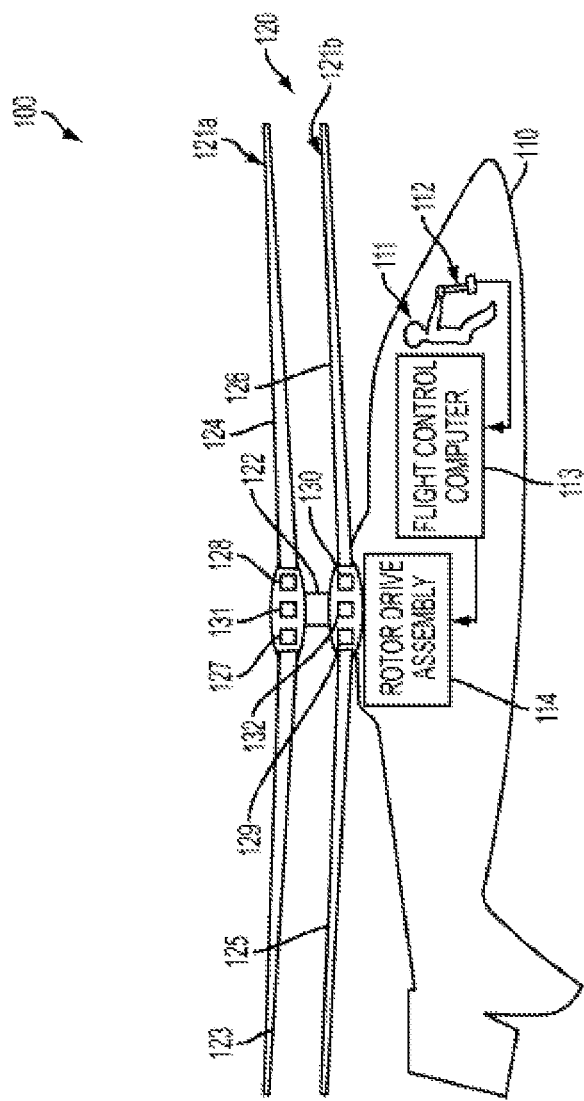
FIG. 1 illustrates a rotor-based system according to an embodiment of the invention.

FIG. 1 illustrates a rotor-based system 100 according to an embodiment of the invention. In embodiments of the invention, the system 100 includes a helicopter or other rotary-wing aircraft. The system 100 includes a fuselage 110 and a compound rotor assembly 120. The compound rotor assembly 120 rotates to lift and maintain the system 100 airborne. In the embodiment illustrated in FIG. 1, the compound rotor assembly 120 includes first and second rotor assemblies 121a and 121b that are co-axial with each other. However, embodiments of the invention encompass any number of rotor assemblies, including rotor-based systems having only one rotor assembly.

The fuselage 110 houses a pilot 111, physical flight controls 112, a flight control computer 113 and a rotor drive assembly 114. In operation, the pilot 111 physically manipulates the physical flight controls 112, which may include a stick, lever, wheel, or any other type of physical control, to generate command signals or values for longitudinal movement, lateral movement and collective movement of the system 100. The flight control computer 113 may interpret positions of mechanical components to generate the commands, or the flight controls 112 may include sensors or other mechanisms to translate physical positions and movements into electrical signals that are transmitted to the flight control computer 113. The flight control computer 113 includes memory, one or more processors, logic and other circuitry to generate, process and/or transmit the command signals or values. The command signals may include a lateral command, a longitudinal command and a collective command to control lateral movement of the system 100, longitudinal movement of the system 100 and collective movement of the system 100. It is understood that the longitudinal command corresponds to a forward and backward motion of the fuselage 110, and in particular to the lowering and raising of the nose and the tail; the lateral command corresponds to a side-to-side motion of the fuselage 110; and the collective command corresponds to the raising or lowering of the entire fuselage 110 simultaneously.

The flight control computer 113 may store flight control programs and other electronics that may take into account various environmental conditions and characteristics of the system 100 to generate the command signals. The command signals are transmitted to the rotor drive assembly 114. The rotor drive assembly 114 may include, for example, one or more motors or engines to drive one or more gears and shafts. The gears and shafts, in turn, drive the compound rotor assembly 120. In one embodiment, the rotor drive assembly 114 drives the first rotor assembly 121a in a first direction and the second rotor assembly 121b in an opposite direction.

The first rotor assembly 121a includes rotor blades 123 and 124, servos 127 and 128 to control the position of the rotor blades 123 and 124 and a servo-control computer 131 to calculate individual rotor control signals for each rotor blade 123 and 124 and to transmit the individual rotor control signals to the respective servos 127 and 128. In other words, the flight control computer 113 transmits to the servo-control computer 131 command signals based on the position of the controls 112. The command signals may include a lateral value, a longitudinal value and a collective value. In one embodiment, the commands output from the flight control computer 113 may not include specific position information for each rotor blade 123 and 124. The lateral value, the longitudinal value and the collective value may need to be converted into servo-control signals for each separate servo 127 and 128. The servo-control computer 131 receives the command signals from the flight control computer 113 and calculates the appropriate individual signals for each separate servos 127 and 128.

Similarly, the second rotor assembly 121b includes rotor blades 125 and 126, servos 129 and 130 to control the position of the rotor blades 125 and 126 and a servo-control computer 132 to calculate individual rotor control signals for each rotor blade 125 and 126 and to transmit the individual rotor control signals to the respective servos 129 and 130. In other words, the flight control computer 113 transmits to the servo-control computer 132 command signals based on the position of the controls 112. The servo-control computer 132 receives the command signals from the flight control computer 113 and calculates the appropriate individual signals for each separate servo 129 and 130.

The separate control signals generated for the separate servos 127, 128, 129 and 130 may be based on each of the lateral, longitudinal and collective command signals, as well as based on an azimuthal position signal corresponding to the azimuthal position of the respective rotor assemblies 121a and 121b. The azimuthal position may be determined based on a position sensor located in one or more of the rotor drive assembly 114, the rotor blades 123, 124, 125 or 126, the hub 122, the fuselage 110, or by any other means of detecting a position of the rotor assemblies 121a and 121b.

While separate computers 113, 131 and 132 have been illustrated in FIG. 1 to generate lateral, longitudinal and collective command signals and individual rotor blade control signals, embodiments of the invention are not limited to the configuration illustrated in FIG. 1. For example, in an alternative embodiment, the flight control computer 113 could generate the individual rotor blade control signals. In another alternative embodiment, the servo-control computers 131 and 132 may be the same computer. In yet another alternative embodiment, the servo-control computers 131 and 132 may be located in the fuselage 110. In other words, embodiments of the invention encompass any unitary or distributed computing system that receives pilot controls and outputs individual and different control signals to different rotor blades of a rotor assembly based on the same command signals generated from the pilot controls.

In one embodiment, the flight control computer 113 operates at a first frequency and the servo-control computers 131 and 132 operate at a second frequency. In one embodiment, the first frequency is less than the second frequency. For example, the first frequency may be in the range of tens or hundreds of hertz, while the second frequency may be in the kilohertz range. In such an embodiment, the flight control computer 113 transmits the lateral, longitudinal and collective commands to the servo-control computers 131 and 132 at the first, lower, frequency, and the servo-control computers 131 and 132 transmit servo-control signals to the servos 127, 128, 129 and 130 at the second, higher, frequency.

In addition, while FIG. 1 illustrates controls 112 that are physically manipulated by a pilot 111, embodiments of the invention are not limited to a human pilot 111 or a pilot 111 located in the fuselage 110. In alternative embodiments, the system 100 may be controlled by a computer executing a computer program, or the system 100 may be controlled remotely by a human or computer controller that is not located in the fuselage 110. In such an embodiment, a computer may replace the physical controls 112 to generate the lateral, longitudinal and collective commands.

In embodiments of the invention, each rotor blade 123, 124, 125 and 126 of the rotor assemblies 121a and 121b is controlled by a separate servo 127, 128, 129 and 130. In other words, the system 100 does not include a swashplate and does not use a swashplate to control the position of the rotor blades 123, 124, 125 or 126. Instead, each rotor blade 123, 124, 125 and 126 is controlled by a separate servo 127, 128, 129 and 120 that receives a separate rotor blade control signal. In one embodiment, the rotor blade control signals are generated by the servo-control computers 131 and 132 to mimic the kinematics of a swashplate, or in other words, to position the rotor blades 123, 124, 125 and 126 in the same manner as if a swashplate was used.

Figure 2:
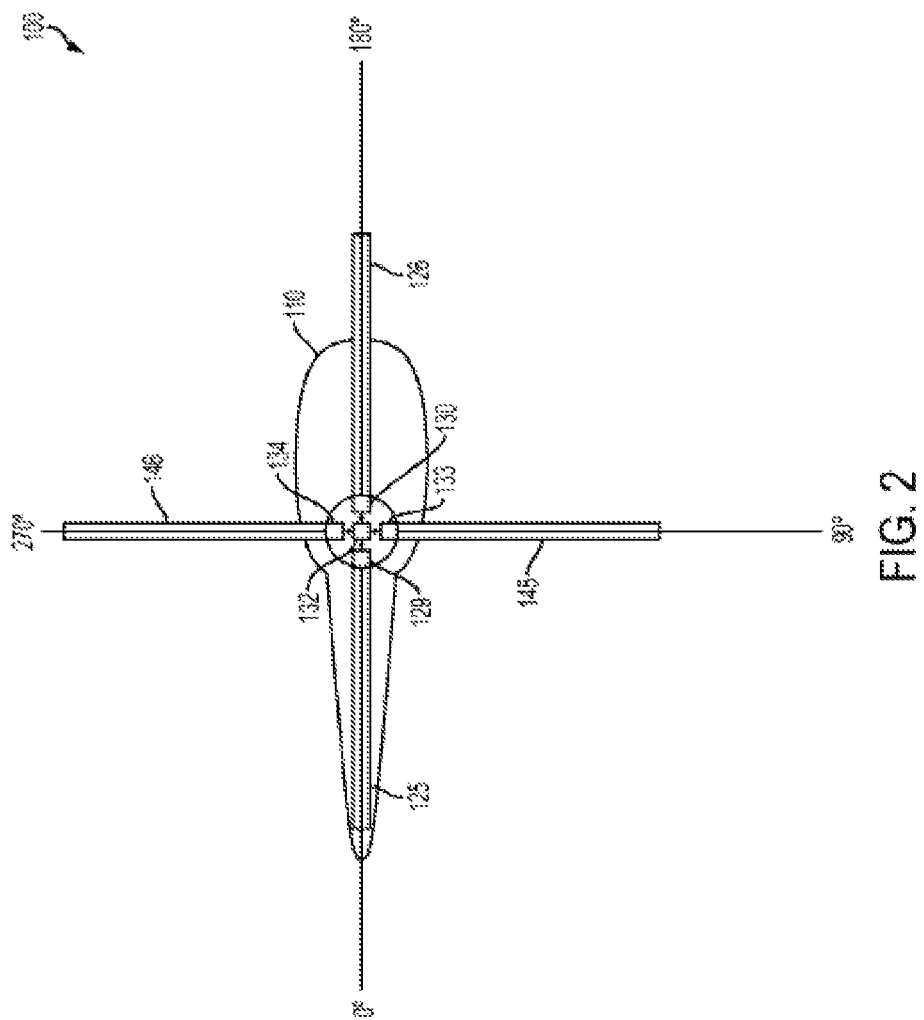
FIG. 2 illustrates azimuth positions of a rotor-based system according to an embodiment of the invention.

FIG. 2 illustrates a reference for determining the azimuthal position of the rotor assembly 121b of FIG. 1, including the rotor blades 125, 126, 145 and 146. As illustrated in FIG. 2, a first rotor blade 125 is controlled by a first servo 129, a second rotor blade 126 is controlled by a second servo 130, a third rotor blade 145 is controlled by a third servo 133 and a fourth rotor blade 146 is controlled by a fourth servo 134. In one embodiment, the rear of the fuselage 110 is defined as a zero degree position, and the angular positions increase in a counter-clockwise direction. In other words, if the first rotor blade 125 is defined as a reference blade, then when the first rotor blade 125 is directed to the rear of the fuselage 110, the azimuthal position of the rotor assembly 121b is zero (0) degrees; when the first rotor blade 125 is at an angle ninety (90) degrees counter-clockwise from the rear of the fuselage 110, the azimuthal position of the rotor assembly 121b is ninety (90) degrees, etc.

Figure 3:
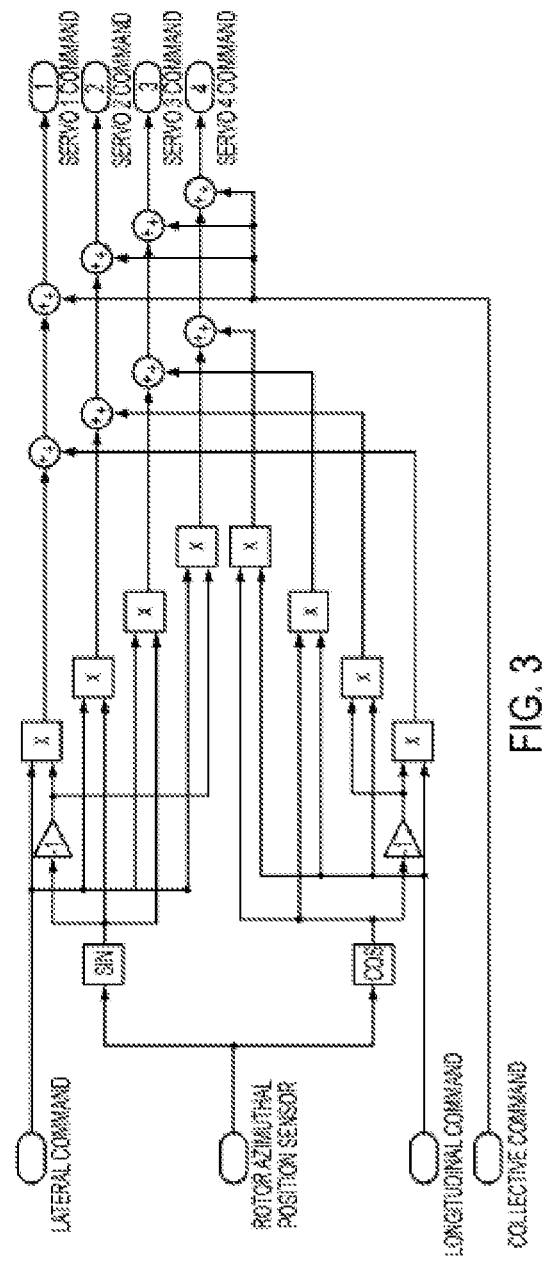
FIG. 3 is a function diagram of an algorithm for generating different rotor control signals according to an embodiment of the invention.
Figure 4:
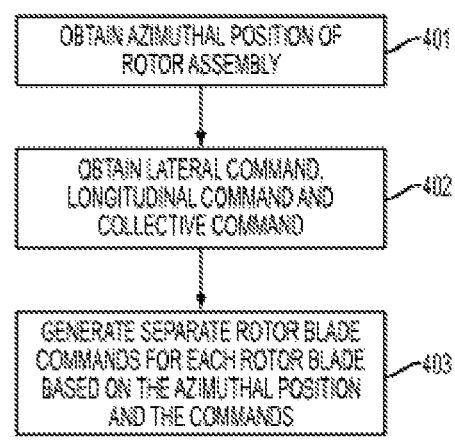
FIG. 4 is a flow diagram of a method for generating rotor control signals according to an embodiment of the invention.

FIG. 3 is a function diagram illustrating the generation of the rotor control signals, also referred to as servo commands 1, 2, 3 and 4, for four different servos controlling four different rotor blades, according to an embodiment of the invention. The function diagram represents a process performed by a processor in a computer configured to generate the rotor control signals, such as the flight control computer 113 or the servo-control computers 131 or 132. FIG. 4 is a flow diagram of the method of generating the control signals.

In block 401, an azimuthal position of the rotor assembly is obtained. The azimuthal position may be obtained by one or more position sensors located in one or more of the rotor blades, the rotor hub, a rotor drive assembly and a fuselage. In block 402, a lateral command, longitudinal command and collective command are obtained. The lateral, longitudinal and collective commands may be obtained from a vehicle flight control apparatus, such as a stick, lever, wheel or other apparatus controlled by a pilot. For example, a flight control computer may generate the lateral, longitudinal and collective commands based on detecting the physical positions of a stick, lever, wheel, pedal or other physical control.

In block 403, rotor blade control signals are generated based on the azimuthal position and the lateral, longitudinal and collective commands. As illustrated in FIG. 3, a separate blade command signal is generated for each separate blade of the rotor assembly to control a position of each blade independent of each other blade. The separate blade command signals are generated based on combining the sine and cosine values of the azimuthal position with the lateral command, the longitudinal command, and the collective command.

In one embodiment, a first rotor blade control signal is generated based on the following formula: $((-1)*\sin(AZ)*LAT)+((-1)\cos(AZ)*LONG)+COLL$, where AZ is the azimuthal position value, LAT is the lateral command, LONG is the longitudinal command and COLL is the collective command.

A second rotor blade control signal is generated based on the following formula: $(\sin(AZ)*LAT)+((-1)\cos(AZ)*LONG)+COLL$.

A third rotor blade control signal is generated based on the following formula: $(\sin(AZ)*LAT)+(\cos(AZ)*LONG)+COLL$.

A fourth rotor blade control signal is generated based on the following formula: $((-1)*\sin(AZ)*LAT)+(\cos(AZ)*LONG)+COLL$.

As described in the above formulas and in FIG. 3, each rotor blade control signal may be generated to be different from each other rotor blade control signal. Alternatively, each rotor blade control signal may be generated by processing the same lateral, longitudinal and collective commands in different ways to obtain different values for the rotor blade control signals. While FIG. 3 illustrates a formula for generating the different rotor blade control commands, it is understood that additional processing may be performed to generate final rotor blade control commands to account for various conditions, including environmental conditions and characteristics of the rotor assemblies or a rotor-based system. In one embodiment, the rotor blade control commands generated by the process described above are phase-shifted to account for the phase shift of the commands resulting from the physical dynamics of the rotor blades. The additional processing may be performed either upstream of the blade control algorithm described above (or may be calculated earlier), or downstream of the blade control algorithm (i.e., the phase shift may be performed after the blade control algorithm is performed).

In addition, while four rotor blade command signals are illustrated by way of example, it is understood that embodiments of the invention encompass rotor systems having any number of rotor blades. For example, the rotor system may include two rotor blades, three rotor blades, five rotor blades or any other number of rotor blades. In each case, the sine and cosine values are obtained of an output of a rotor azimuthal position sensor. The sine and cosine values are combined with the lateral command value, longitudinal command value and collective command values to generate servo commands. A negative value may be applied to one of the sine and cosine values depending upon the number of blades. For example, embodiments including two blades, or a multiple of four blades, the negative of a sine or cosine may be calculated in the process of obtaining the rotor blade control signals. In one embodiment, the azimuthal position of one rotor blade is measured by a sensor, and the azimuthal positions of the remaining rotor blades are calculated based on the position of the measured blade.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for controlling rotor blades of a rotor assembly, comprising:
   determining an azimuthal position of a rotor assembly;
   identifying a lateral command value, a longitudinal command value and a collective command value of a rotor assembly control system;
   calculating a sine value and a cosine value of the azimuthal position;
   generating a separate blade control signal for each separate blade of the rotor assembly to control a position of each blade independent of each other blade based on combining the sine value and cosine value of the azimuthal position with the lateral command value, the longitudinal command value and the collective command value, wherein the sine value of the azimuthal position is combined with the lateral command, and the cosine value of the azimuthal position is combined with the longitudinal command, and wherein each blade control signal is generated to be different from each other blade control signal; and
   adjusting the position of one or more blades in response to the separate blade control signals generated.

2. The method of claim 1, wherein the lateral command value, the longitudinal command value and the collective command value are generated by a flight control system.

3. The method of claim 2, wherein the lateral command, longitudinal command and collective command of the flight control system are generated based on pilot-manipulated physical controls.

4. The method of claim 1, wherein combining the sine and cosine values of the azimuthal position with the lateral, longitudinal and collective command values comprises:
generating a first blade control signal based on multiplying the sine of the azimuthal position by negative one (−1) to obtain a first result and combining the first result with the lateral command value, the longitudinal command value and the collective command value; and
generating a second blade control signal based combining the sine of the azimuthal position with the lateral command value, the longitudinal command value and the collective command value, without multiplying the sine of the azimuthal position by negative one (−1).

5. The method of claim 4, wherein combining the first result with the lateral command value, the longitudinal command value and the collective command value comprises:
multiplying the first result by the lateral command value to obtain a second result;
adding the second result to the cosine of the azimuthal position to obtain a third result; and
adding the third result to the collective command value.

6. The method of claim 4, wherein combining the sine of the azimuthal position with the lateral command value, the longitudinal command value and the collective command value, without multiplying the sine of the azimuthal position by negative one (−1), comprises:
multiplying the sine of the azimuthal position by the lateral command value to obtain a fourth result;
adding the fourth result to the cosine of the azimuthal position to obtain a fifth result; and
adding the fifth result to the collective command value.

7. The method of claim 1, further comprising:
transmitting the separate blade control signals to separate blade positioning servos wherein the separate blade positioning servos control the positions of each separate blade.

8. A rotor blade position control assembly, comprising:
a rotor including a plurality of rotor blades;
first and second rotor blade control servos connected to separate first and second blades among the plurality of rotor blades to control the position of the first and second blades;
a flight control computer for transmitting command signals including a lateral command value, a longitudinal command value, a collective command value, and an azimuthal position signal, wherein the flight control computer operates at a first frequency; and
a rotor blade control computer configured to receive the command signals from the flight control computer, the rotor blade control computer operating at a second frequency, wherein the rotor blade control computer calculates a sine value and a cosine value of the azimuthal position, and generates a first rotor blade control signal for transmission to the first rotor blade control servo and a second rotor blade control signal for transmission to the second rotor blade control servo based on combining the sine value and cosine values of the azimuthal position with the lateral command value, the longitudinal command value and the collective command value, wherein the sine value of the azimuthal position is combined with the lateral command, and the cosine value of the azimuthal position is combined with the longitudinal command, and wherein the first rotor blade control signal is generated to be different than the second rotor blade control signal.

9. The rotor blade position control assembly of claim 8, further comprising:
physical flight controls configured to be physically manipulated by a pilot to generate the lateral command, longitudinal command and collective command.

10. The rotor blade position control assembly of claim 8, wherein combining the sine and cosine values of the azimuthal position with the lateral, longitudinal and collective command values comprises:
generating the rotor first blade control signal based on multiplying the sine of the azimuthal position by negative one (−1) to obtain a first result and combining the first result with the lateral command value, the longitudinal command value and the collective command value; and
generating the second rotor blade control signal based combining the sine of the azimuthal position with the lateral command value, the longitudinal command value and the collective command value, without multiplying the sine of the azimuthal position by negative one (−1).

11. The rotor blade position control assembly of claim 10, wherein combining the first result with the lateral command value, the longitudinal command value and the collective command value comprises:
multiplying the first result by the lateral command value to obtain a second result;
adding the second result to the cosine of the azimuthal position to obtain a third result; and
adding the third result to the collective command value.

12. The rotor blade position control assembly of claim 10, wherein combining the sine of the azimuthal position with the lateral command value, the longitudinal command value and the collective command value, without multiplying the sine of the azimuthal position by negative one (−1), comprises:
multiplying the sine of the azimuthal position by the lateral command value to obtain a fourth result;
adding the fourth result to the cosine of the azimuthal position to obtain a fifth result; and
adding the fifth result to the collective command value.

13. A rotor blade control computer for controlling rotor blades of a rotor assembly, comprising:
memory configured to store a rotor blade control program and one or more of an azimuthal position value, a lateral command value, a longitudinal command value and a collective command value; and
a processor configured to execute the rotor blade control program to perform a method for controlling the rotor blades of the rotor assembly, the method comprising:
obtaining the azimuthal position value of a rotor assembly;
obtaining the lateral command value, the longitudinal command value and the collective command value;
calculating a sine value and a cosine value of the azimuthal position;
generating a first rotor blade control signal to transmit to a first rotor blade control servo for controlling a first rotor blade of the rotor assembly and a second rotor blade control signal to transmit to a second rotor blade control servo to control a second rotor blade of the rotor assembly, the first rotor blade control signal and the second rotor blade control signal generated based on combining the sine value and cosine values of the azimuthal position with the lateral command value, the longitudinal command value and the collective command value, wherein the sine value of the azimuthal position is combined with the lateral command, and the cosine value of the azimuthal position is combined with the longitudinal command, and wherein the first rotor blade control signal is generated to be different than the second rotor blade control signal; and adjusting a position of the first rotor blade in response to the first rotor blade control signal and a position of the second rotor blade in response to the second rotor blade control signal.

14. The rotor blade control computer of claim 13, wherein the rotor assembly consists of four rotor blades, and combining the sine and cosine values of the azimuthal position with the lateral, longitudinal and collective command values comprises:

generating the rotor first blade control signal based on multiplying the sine of the azimuthal position by negative one (−1) to obtain a first result and combining the first result with the lateral command value, the longitudinal command value and the collective command value; and generating the second rotor blade control signal based combining the sine of the azimuthal position with the lateral command value, the longitudinal command value and the collective command value, without multiplying the sine of the azimuthal position by negative one (−1).

15. The rotor blade control computer of claim 14, wherein combining the first result with the lateral command value, the longitudinal command value and the collective command value comprises:

multiplying the first result by the lateral command value to obtain a second result;

adding the second result to the cosine of the azimuthal position to obtain a third result; and adding the third result to the collective command value.

16. The rotor blade control computer of claim 14, wherein combining the sine of the azimuthal position with the lateral command value, the longitudinal command value and the collective command value, without multiplying the sine of the azimuthal position by negative one (−1), comprises:

multiplying the sine of the azimuthal position by the lateral command value to obtain a fourth result;

adding the fourth result to the cosine of the azimuthal position to obtain a fifth result; and adding the fifth result to the collective command value.

17. The rotor blade control computer of claim 13, wherein the processor generates the first rotor blade control signal according to the following formula:

$$((-1)*sin(AZ)*LAT)+((-1)cos(AZ)*LONG)+COLL,$$

the processor generates the second rotor blade control signal according to the following formula:

$$(sin(AZ)*LAT)+((-1)cos(AZ)*LONG)+COLL;$$

the processor generates a third rotor blade control signal according to the following formula:

$$(sin(AZ)*LAT)+(cos(AZ)*LONG)+COLL; \text{ and}$$

the processor generates a fourth rotor blade control signal according to the following formula:

$$((-1)*sin(AZ)*LAT)+(cos(AZ)*LONG)+COLL,$$

wherein AZ is the azimuthal position value, LAT is the lateral command value, LONG is the longitudinal command value and COLL is the collective command value.

* * * * *